United States Patent
Murakami et al.

(10) Patent No.: US 6,608,843 B1
(45) Date of Patent: Aug. 19, 2003

(54) PILOT SIGNAL TRANSMISSION TECHNIQUE AND DIGITAL COMMUNICATION SYSTEM USING SAME

(75) Inventors: Yutaka Murakami, Yokohama (JP); Masayuki Orihashi, Ichikawa (JP); Akihiko Matsuoka, Yokohama (JP); Morikazu Sagawa, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/292,398

(22) Filed: Apr. 15, 1999

(30) Foreign Application Priority Data

Apr. 16, 1998 (JP) .......................................... 10-105990

(51) Int. Cl.⁷ ................................................ H04B 3/10
(52) U.S. Cl. ...................... 370/500; 370/206; 370/242
(58) Field of Search ................................ 370/491, 465, 370/466, 467, 480, 500, 203, 204, 206, 207, 208, 242, 328, 333, 337, 345, 347, 520, 503; 375/222, 320, 322, 323, 329, 226, 324

(56) References Cited

U.S. PATENT DOCUMENTS

| | | | | |
|---|---|---|---|---|
| 5,533,048 A | * | 7/1996 | Dolan ......................... | 375/222 |
| 5,550,811 A | * | 8/1996 | Kaku et al. .................. | 370/342 |
| 5,734,647 A | * | 3/1998 | Yoshida et al. .............. | 370/335 |
| 5,838,728 A | * | 11/1998 | Alamouti et al. ........... | 375/265 |
| 5,907,585 A | * | 5/1999 | Suzuki et al. ............... | 375/324 |
| 5,963,589 A | * | 10/1999 | Nagano et al. ............. | 375/224 |
| 6,097,714 A | * | 8/2000 | Nagatani et al. ........... | 370/342 |

OTHER PUBLICATIONS

"Rayleigh Fading Compensation Method for 16QAM MODEM in Digital Land Mobile Radio Systems" by Seiichi Sampei; The Transactions of the Institute of Electronics, Information and Communication Engineerings; B–II vol. J72–B–II No. 1; Jan., 1989; pp. 7–15(w/partial Eng. translation).

* cited by examiner

Primary Examiner—Douglas Olms
Assistant Examiner—Brian Nguyen
(74) Attorney, Agent, or Firm—Connolly Bove Lodge & Hutz LLP

(57) ABSTRACT

In a digital communication system such as a mobile radio system, fading distortion is compensated with a raised precision. In a transmitter, pilot signals are regularly inserted in the information signals. The amplitude of the pilot signals are set larger than the maximum possible amplitude of the information signals. The modulation scheme of the pilot signals may be different from that of the information signals. In a receiver, the fading distortion of each of the pilot signals is determined. The fading distortions of the information signals are estimated by interpolation using the determined fading distortion of the pilot signal, and then compensated. The frequency band of each information signal is preferably limited with a roll-off filter with a roll-off coefficient ranging from 0.1 to 0.4.

34 Claims, 5 Drawing Sheets

16—APSK $R_i < R$
$i = 1, 2, \cdots, 16$

OPERATION OF THE PILOT SIGNAL INSERTER 110

$2^m$—QAM

16—QAM

8-PSK r<R
i=1, 2, ···, 8

QPSK r<R
i=1, 2, 3, 4

PILOT SIGNAL TRANSMISSION TECHNIQUE AND DIGITAL COMMUNICATION SYSTEM USING SAME

BACKGROUND OF THE INVENTION

1. Field of the Invention

The invention relates to a digital communications system and more specifically to modulation methods facilitating fading distortion compensation that performs a quasi-synchronous detection using a pilot signal.

2. Description of the Prior Art

In a digital communications system, especially in a digital mobile radio system, the envelope of information signals or symbols is distorted (i.e., the phases and the amplitudes of information signals involves phase errors and amplitude errors) due to fading. The phase error of the received signal causes an error in the frequency of a local oscillator in the receiver. The error of the local oscillation frequency with respect to the carrier frequency is hereinafter referred to as a "frequency offset". The phase error (or frequency offset) and the amplitude error of the received signal have to be estimated and compensated for in the receiver.

A fading distortion compensation scheme using a pilot signal is described by S. Sampei, "Rayleigh Fading Compensation Method for 16-QAM MODEM in Digital Land Mobile Radio Systems," Trans. IEICE (The Institute of Electronics, Information and Communication Engineers) Japan, Vol. J72-B-II, No. 1, January 1989, pp. 7–15 (which is hereby incorporated by reference). FIG. 1 is a diagram showing a signal constellation used in this 16-QAM system. In FIG. 1, small black-filled circles indicate 16 signal points in an in-phase (I) and quadrature-phase (Q) plane. One of the signal points with the maximum amplitude, that is, any of the signal points A, B, C and D is assigned to a pilot signal. (Since one of the 16 signal points in the signal constellation is used for a pilot signal, the remaining 15 points are available for the information signals.) A pilot signal is inserted in every frame or every N−1 information symbols (assuming that N symbols constitute one frame) in a transmitter. The estimation and compensation of distortions (due to fading) of information signals or symbols are achieved by interpolation using the pilot signals.

In such quasi-synchronous detection as just described, larger-amplitude pilot symbols yields a higher precision in estimation of the frequency offset and the amplitude error of the information signals, which results in an improvement of the bit error rate, which is a function of the ratio of the carrier signal power to the noise power density per one symbol. However, enlarging the amplitude of the pilot signals without taking any measure lowers the power efficiency of the power amplifier of the transmitter system due to an increase in the ratio of the peak to the average transmission power.

It is therefore an object of the invention to provide a method of and a system for compensating for fading distortion of the received signal with a raised precision and thereby to provide a digital communication system that permits a reception of a reduced bit error rate.

SUMMARY OF THE INVENTION

In accordance with the principles of the invention, a point that differs in phase from any of the signal points for possible information symbols and that is larger in amplitude than any of the signal points is selected for a pilot signal point in a signal constellation (or a signal point map plotted on a in-phase and quadrature-phase plane). A pilot signal is inserted in every frame or every predetermined number of information signals.

In a receiver, the fading distortion of each of the pilot signals regularly inserted in the received signals is determined. The fading distortions of the information signals are estimated by interpolation using the determined fading distortion of the pilot signal, and then compensated for.

In a preferred embodiment, the amplitude of the pilot signal is set not larger than 1.6 times a maximum possible amplitude of the information signals.

The frequency band of each information signal is preferably limited with a roll-off filter with a roll-off coefficient ranging from 0.1 to 0.4.

BRIEF DESCRIPTION OF THE DRAWING

The features and advantages of the present invention will be apparent from the following description of an exemplary embodiment of the invention and the accompanying drawing, in which.

Throughout the drawing, the same elements when shown in more than one figure are designated by the same reference numerals.

DETAILED DESCRIPTION OF THE PREFERRED EMBODIMENTS

Figure 2:
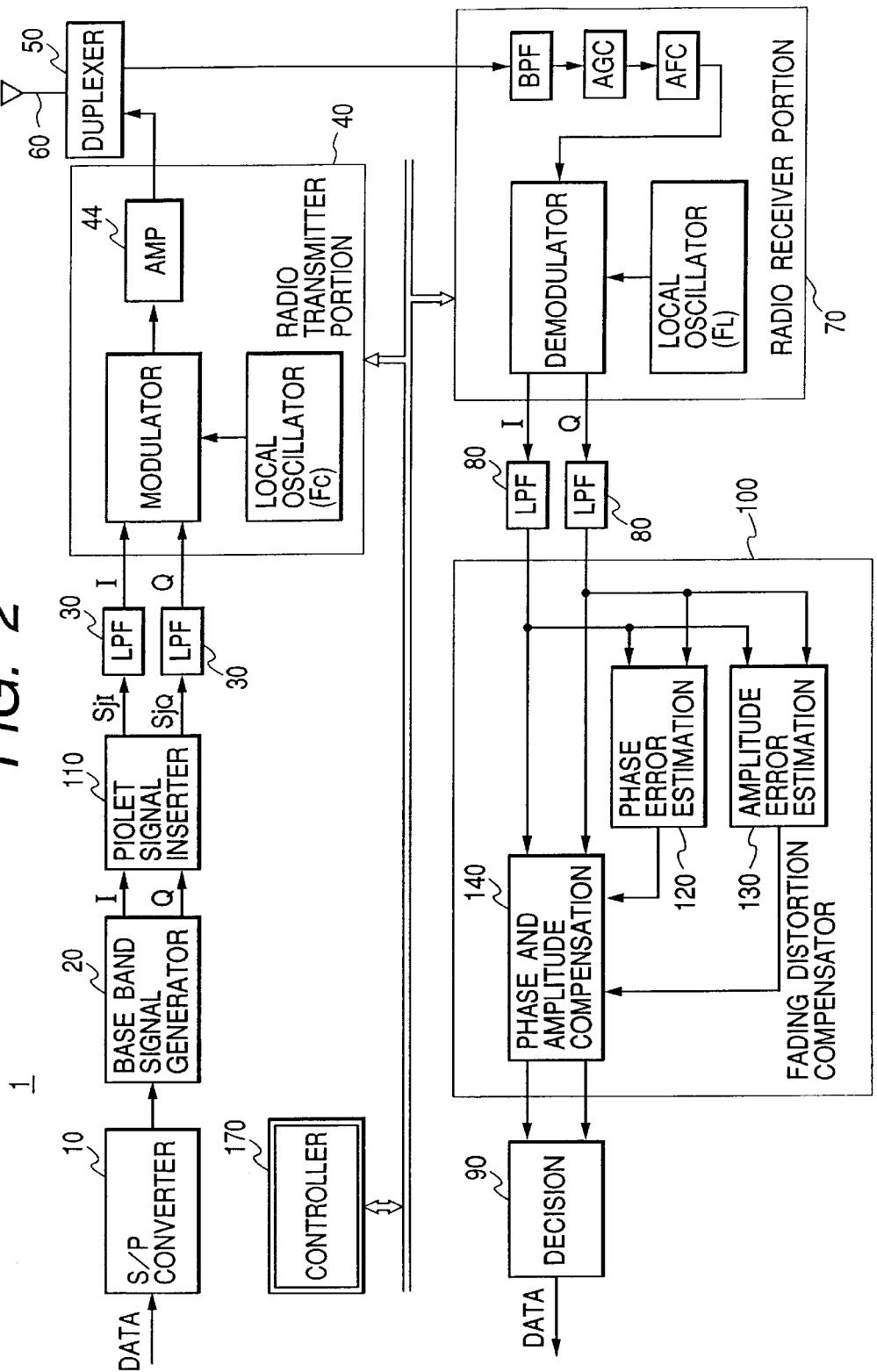
FIG. 2 is a schematic block diagram showing a part of an illustrative embodiment of a mobile telephone terminal that incorporates a fading distortion compensation system in accordance with the principles of the invention.

FIG. 2 is a schematic block diagram showing a part of an illustrative embodiment of a mobile telephone terminal 1 that incorporates a fading distortion compensation system in accordance with the principles of the invention. A transmission system (shown in upper part of FIG. 2) of the mobile telephone terminal 1 includes a serial-to-parallel (S/P) converter 10; a base band signal generator 20 having its input connected with a converter 10 output; a pilot (or frame) signal inserter 110 having its in-phase (I) input and quadrature-phase (Q) input connected with respective outputs of the base band signal generator 20; low pass filters (LPF) 30 having their inputs connected with pilot signal inserter 110 outputs; a radio transmitter portion 40 having its I and Q inputs connected with I and Q LPF 30 outputs, respectively; an antenna duplexer 50 having transmission input connected with the transmitter portion 40 output; and an antenna 60 used for both transmission and reception. A reception system (shown in lower part of FIG. 2) of the mobile telephone terminal 1 includes a radio receiver portion 70 having its input connected with a duplexer 50 reception output; LPFs 80 having their input connected with radio receiver portion 70 I and Q outputs; a fading distortion compensator 100 having its I and Q inputs connected with respective LPF 80 outputs; and a decision maker 90, having its input connected with a compensator 100 output, for providing received data. The fading distortion compensator 100 includes a phase error estimator 120, an amplitude error estimator 130 and a phase and amplitude compensator 140. The mobile telephone terminal 1 further includes a controller 170 for controlling overall operation of the terminal 1.

In transmission operation, binary data is supplied in the form of a bitstream to the S/P converter 10. The S/P converter 10 converts the serial binary data into a parallel data of a predetermined number of bits. The base band signal generator 20 generates an in-phase (I) and quadrature-phase (Q) components or signals for a symbol associated with the parallel data.

Figure 1:
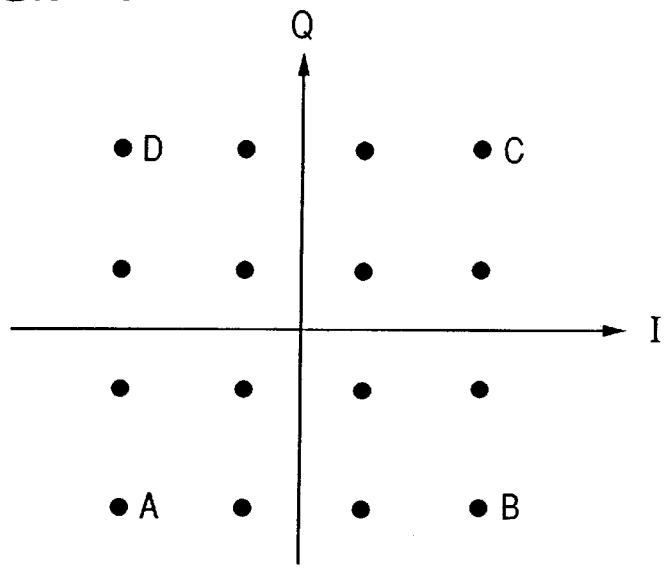
FIG. 1 is a diagram showing a signal constellation used in this 16-QAM system.
Figure 3:
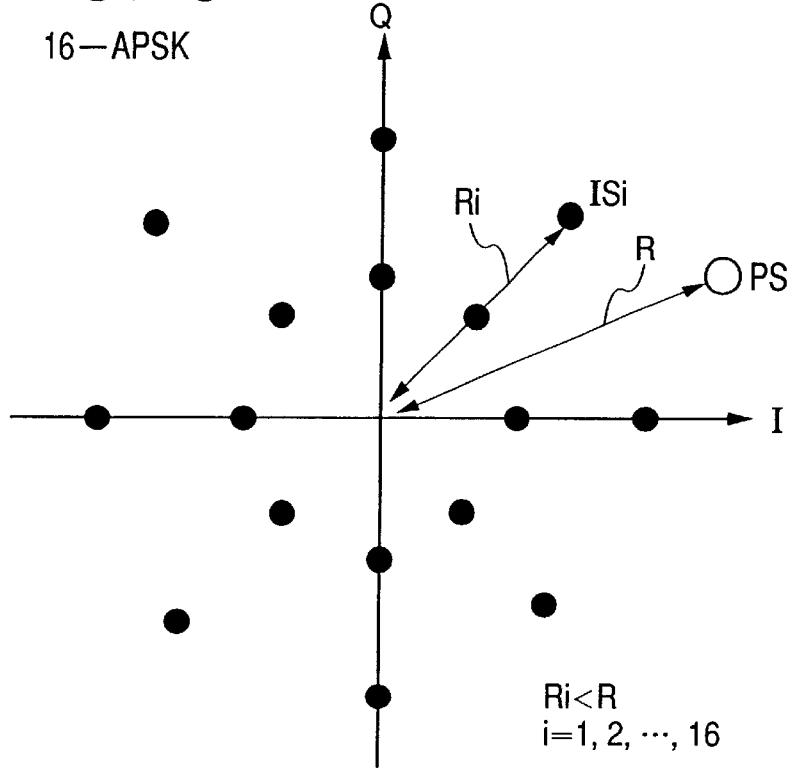
FIG. 3 is a diagram of an exemplary signal constellation for 16-APSK (amplitude phase shift keying) used in a first example.
Figure 4:
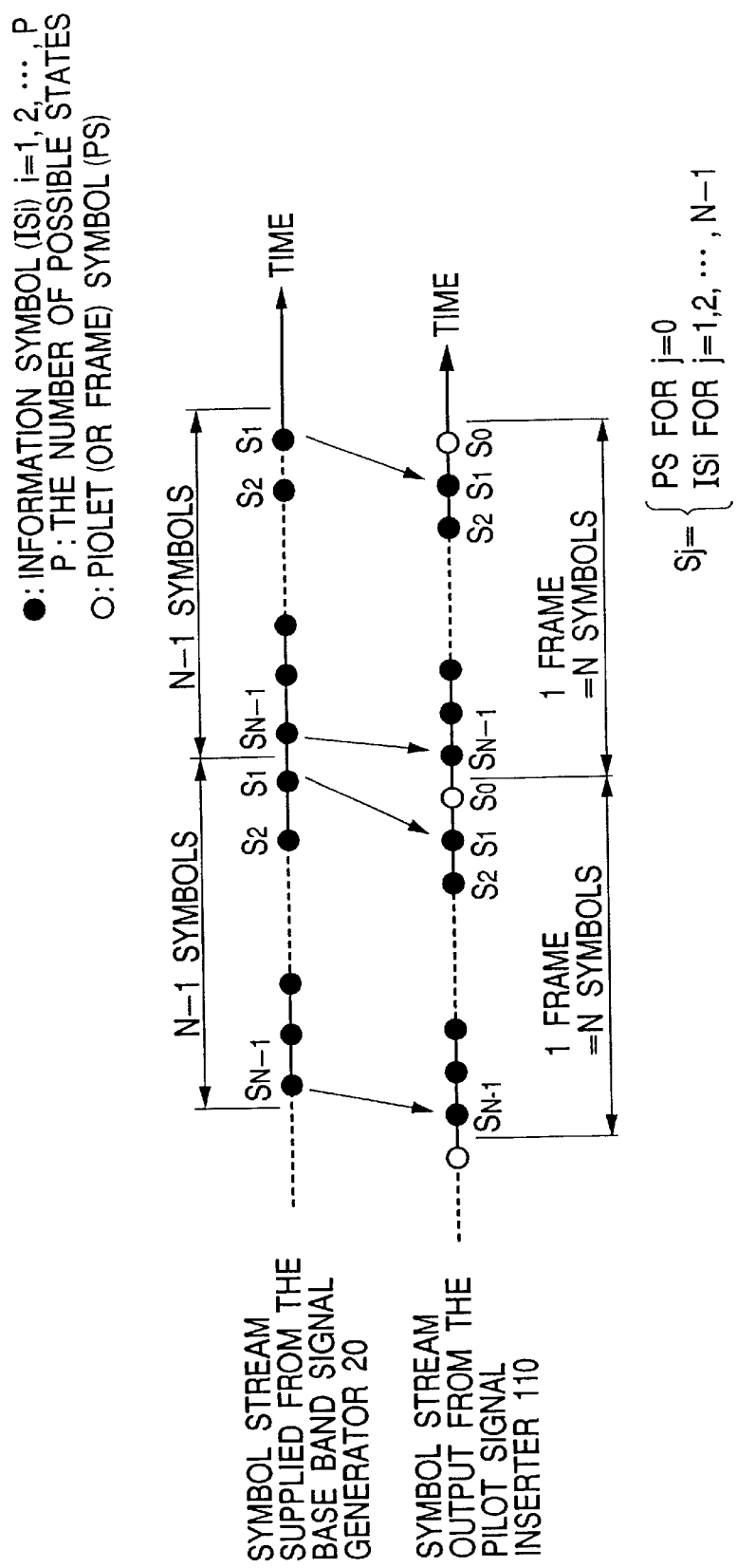
FIG. 4 is a diagram showing a symbol stream transmitted in a digital communication system that serves the mobile telephone terminal 1 of FIG. 1.

FIG. 3 is a diagram of an exemplary signal constellation for 16-APSK (amplitude phase shift keying) used in a first example. FIG. 4 is a diagram showing an operation of the pilot signal inserter 110 of FIG. 3. In FIGS. 3 and 4 and the following figures of signal communications, small black-filled circles indicate information symbols and small white-filled circles indicate pilot (or frame) symbols.

In this specific example, the base band signal generator 20 generates I and Q components of one (ISi) of the 16 possible information symbols $IS_1, IS_2, \ldots, IS_P$ which is associated with each of the parallel data supplied to the generator 20, where i=1, 2, . . . P, and P is the number of possible information symbols (16 in this specific example) in the modulation scheme. The information symbol stream supplied from the base band signal generator 20 is shown in the upper part of FIG. 4.

The pilot signal inserter 110 inserts a pilot signal PS in every predetermined number of information symbols, say, N−1 symbols $S_1, \ldots S_{N-1}$ to make a frame of N symbols $S_0, S_1, \ldots S_{N-1}$ as shown in FIG. 4. In each frame of the symbol stream output from the pilot signal inserter 110, $$Sj = \begin{cases} PS & \text{for } j = 0 \\ IS_i & \text{for } j = 1, 2, \ldots, N-1. \end{cases} \quad (1)$$

It is seen from FIG. 3 that the pilot signal PS ($=S_0$) is preferably disposed so as to make an angle of π/8 with adjacent information signal points. Thus, the pilot signal $PS=(PS_I, PS_Q)$ is preferably set to any of the following points:

$$PS_I = R*\cos\left(\frac{i\pi}{4} + \frac{\pi}{8}\right)$$

$$PS_Q = R*\sin\left(\frac{i\pi}{4} + \frac{\pi}{8}\right),$$

where i=1, 2, . . . , 16 and R is the amplitude of the pilot signal PS.

According to the invention, the amplitude R of the pilot signal PS is set larger than that of any information signal Sj (=ISi), Ri, as shown in FIG. 3. Specifically, it is preferable to set the pilot signal amplitude R for a range larger than the maximum amplitude Rmax of the information symbols and not larger than 1.6 times the maximum amplitude Rmax, that is, $$R\text{max} < R \leq 1.6*R\text{max}. \quad (2)$$

It is noted that each signal Sj is processed in the form of corresponding I and Q components $Sj_I$ and $Sj_Q$. The signals Sj from the pilot signal inserter 110 is limited in frequency band by the LPFs 30. The LPFs 30 are preferably roll-off filters (or Nyquist filters) having the following characteristic:

$$H(\omega) = \begin{cases} 1 & \omega \leq \omega_0(1-\alpha) \\ \sqrt{\frac{1}{2}\left[1 - \sin\left(\frac{\pi}{2\alpha\omega_0}(\omega-\omega_0)\right)\right]} & \omega_0(1-\alpha) \leq \omega \leq \omega_0(1+\alpha) \\ 0 & \omega \geq \omega_0(1+\alpha). \end{cases} \quad (3)$$

where $H(\omega)$ is a amplitude characteristic of the roll-off filters 30, ω is an angular frequency, $\omega_0$ is a Nyquist angular frequency and α is a roll-off coefficient. It is preferable to set the roll-off coefficient α for a range from 0.1 to 0.4.

The filtered signals are modulated and amplified by the radio transmitter portion 40, and eventually transmitted via the duplexer 50 and the antenna 60.

In reception operation, the I and Q components of the received signals received by the antenna 50, the duplexer 60 and the radio receiver portion 70 is filtered by the LPFs 80 and supplied to the phase error estimator 120, the amplitude error estimator 130 and the phase and amplitude compensator 140. The phase error estimator 120 provides an estimated phase error signal to the compensator 140. The amplitude error estimator 130 provides, to the compensator 140, an estimated amplitude error signal for each information signal Sj (j=1, 2, . . . N−1) through interpolation using a pilot signal $S_0$. The phase and amplitude compensator 140 responsively compensates each information signal by using the estimated phase and amplitude error signals to provide compensated I and Q components. The decision maker 90 provides data associated with the compensated I and Q components.

In this way, the invention enables the bit error rate to be reduced without influencing on the ratio of peak to average power at the amplifier (AMP) 44 in the radio transmission portion 40 because the precision in estimation of frequency and amplitude errors of the information signals is enhanced.

MODIFICATION

Though the embodiment has been described in conjunction with the 16-APSK the invention is applicable to any more-than-7-signal-point modulation scheme. Examples are presented for $2^m$-QAM (quadrature amplitude modulation) (m≦3), 16-QAM, 8-PSK (phase shift keying) and QPSK (quadrature phase shift keying) in the following.

FIGS. 5 through 8 are signal constellations for $2^m$-QAM (m≦3), 16-QAM, 8-PSK and QPSK according to the principles of the invention.

Figure 5:
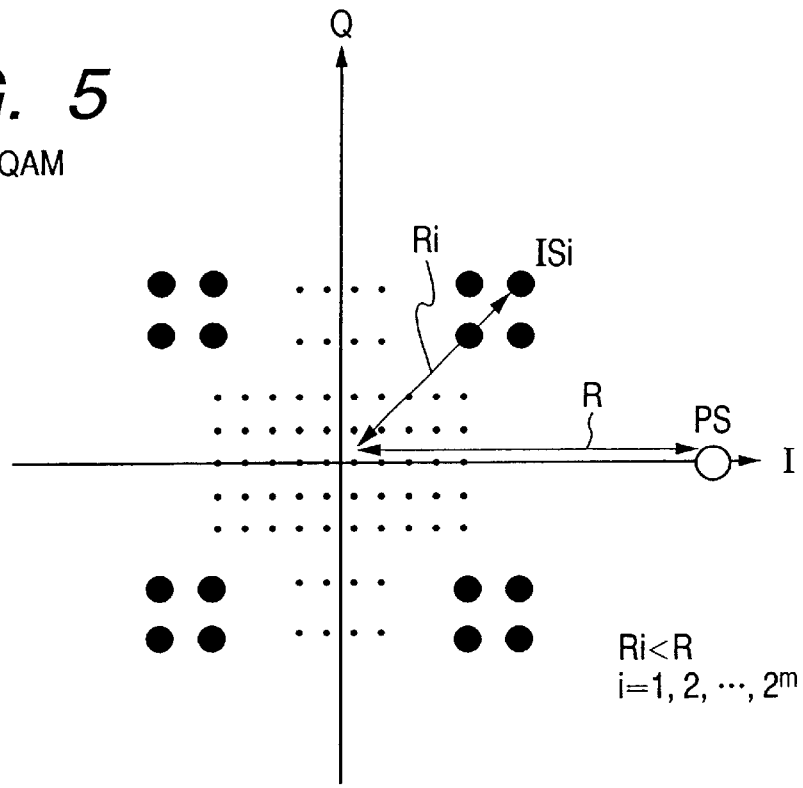
FIGS. 5 through 8 are signal constellations for $m$-QAM, 16-QAM, 8-PSK and QPSK according to the principles of the invention.

As for $2^m$-QAM as shown in FIG. 5, if the information signal points ISi (i=1, 2, . . . , $2^m$) are written as ($ISi_I$, $ISi_Q$) in I-Q coordinates, the points are expressed as follows:

$$ISi_I = s(2^{m-1}a_1 + 2^{m-2}a_2 + \ldots + 2^0 a_m)$$

$$ISi_Q = s(2^{m-1}b_1 + 2^{m-2}b_2 + \ldots + 2^0 b_m) \quad (4)$$

where s is a constant and each of $a_k$ and $b_k$ (k=1, 2, . . . m) represents 1 and −1, i.e., ($a_k, b_k$) represents four points (1, 1), (1, −1), (−1, 1) and (−1, −1). In this case, the pilot signal PS is disposed on either of the I and Q axes such that the amplitude (R) of PS is larger than that (Ri) of any possible symbol points. In the specific example of FIG. 5, the pilot signal is disposed on the positive range of the I axis.

In case of 16-QAM, the possible symbol points are expressed as follows:

$$ISi_I = s(2^1 a_1 + 2^0 a_2)$$

$$ISi_Q = s(2^1 b_1 + 2^0 b_2). \quad (5)$$

Figure 6:
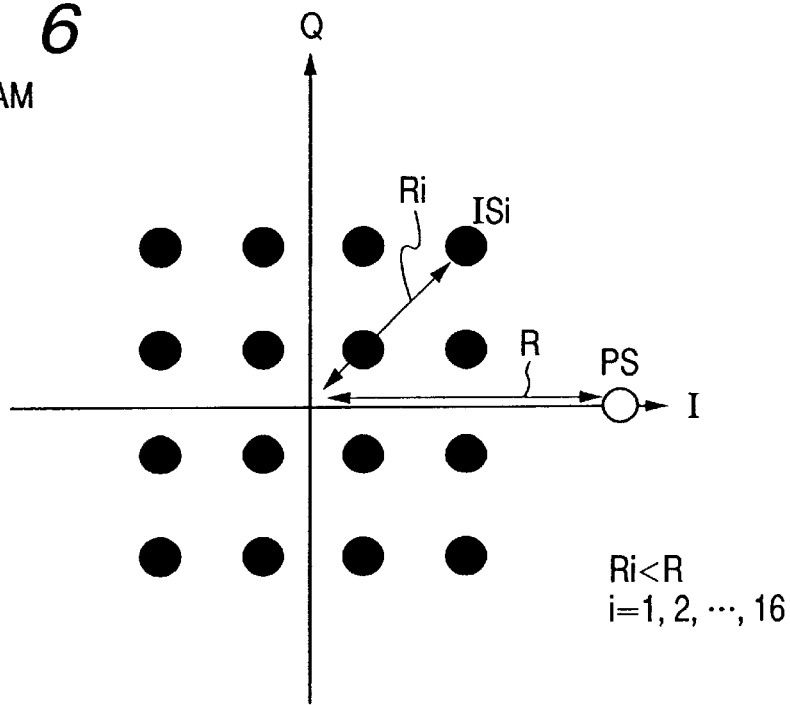

In this case, the pilot signal PS is preferably disposed on either of the I and Q axes such that the amplitude (R) of PS is larger than that (Ri) of any possible symbol points ISi as shown in FIG. 6

Figure 7:
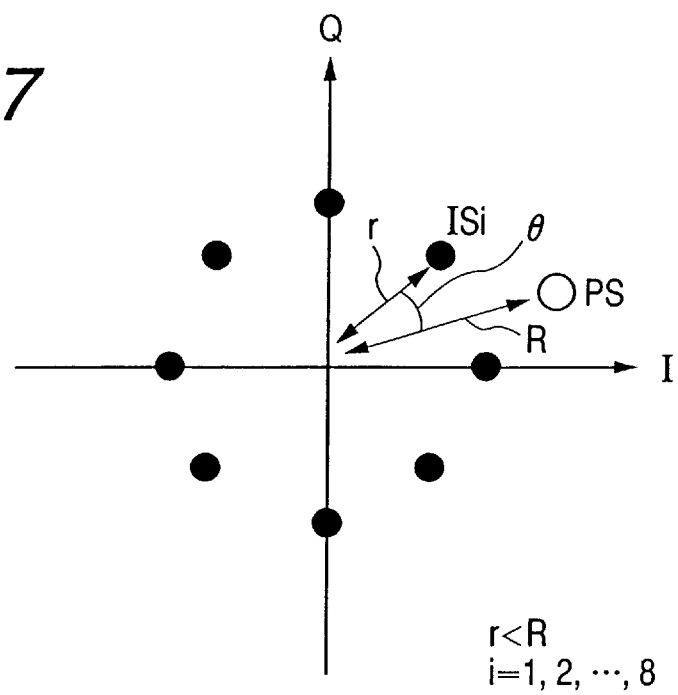

In case of 8-PSK as shown in FIG. 7, the possible signal points are expressed as:

$$ISi_I = r*\cos(i\pi/4)$$
$$ISi_Q = r*\sin(i\pi/4). \qquad (6)$$

In this case, since the pilot signal PS is preferably disposed so as to make an angle of $\pi/8$ with adjacent information points, the pilot signal PS=(PS$_I$, PS$_Q$) is preferably set to any of the following points:

$$PS_I = R*\cos\left(\frac{i\pi}{4} + \frac{\pi}{8}\right)$$
$$PS_Q = R*\sin\left(\frac{i\pi}{4} + \frac{\pi}{8}\right)$$

where k=1, 2, . . . , 8 and R is the amplitude of the pilot symbol that satisfy:

$$r < R \leq 1.6*r.$$

Figure 8:
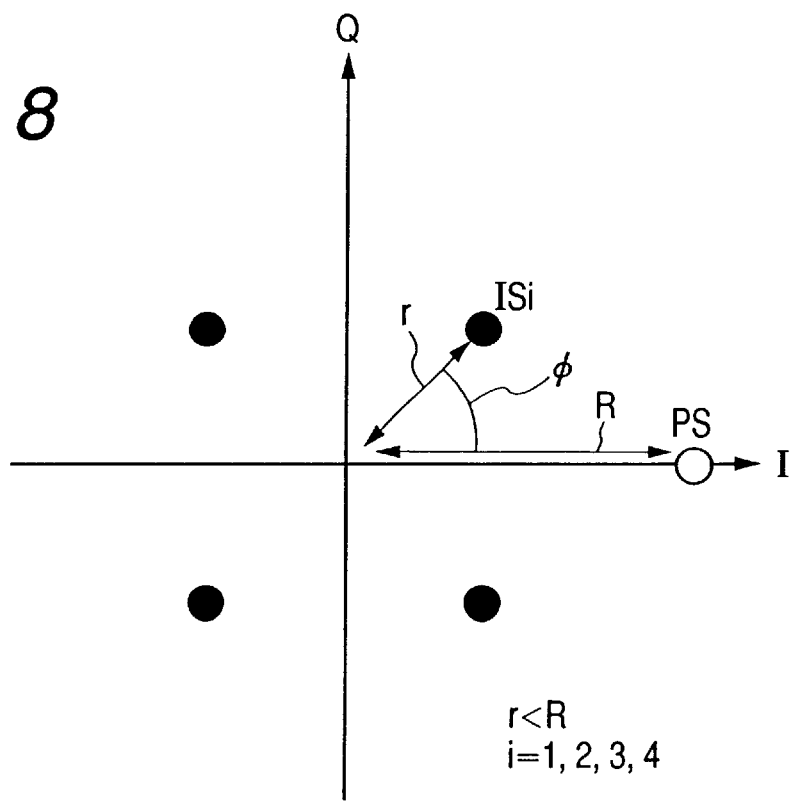

In case of QPSK as shown in FIG. 8, the possible signal points are expressed as:

$$ISi_I = r*\cos\left(\frac{\pi}{4} + \frac{i\pi}{2}\right) \qquad (7)$$
$$ISi_Q = r*\sin\left(\frac{\pi}{4} + \frac{i\pi}{2}\right).$$

In this case, since the pilot signal PS is preferably disposed so as to make an angle of $\pi/4$ with adjacent information points, the pilot signal PS=(PS$_I$, PS$_Q$) is preferably set to any of the following points:

$$PS_I = R*\cos\left(\frac{\pi}{2}(1+i)\right)$$
$$PS_Q = R*\sin\left(\frac{\pi}{2}(1+i)\right).$$

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of transmitting digital data by wireless so as to enable a reception at a reduced bit error rate in a digital wireless communications system, the method including the steps of:

converting said digital data into a first stream of information signals through an 8-or-more-signal-point modulation scheme;

inserting a pilot signal regularly in said first stream of said information signals to generate a second stream, an amplitude of said pilot signal being larger than that of any of said information signals; and transmitting said second stream by wireless.

2. A method as defined in claim 1, wherein said step of inserting a pilot signal includes the step of setting said amplitude of said pilot signal not larger than 1.6 times a maximum possible amplitude of said information signals.

3. A method as defined in claim 1, further including the step of limiting a frequency band of each information signal with a roll-off filter with a roll-off coefficient ranging from 0.1 to 0.4.

4. A method as defined in claim 1, wherein said 8-or-more-signal-point modulation scheme is a 16-amplitude phase shift keying.

5. A method as defined in claim 4, wherein said step of inserting a pilot signal includes the step of generating said pilot signal so as to make an angle of $\pi/8$ with adjacent information signals in an in-phase and quadrature-phase signal space.

6. A method as defined in claim 1, wherein said 8-or-more-signal-point modulation scheme is a $2^m$-signal-point quadrature amplitude modulation, where m is a positive integer not smaller than 3.

7. A method as defined in claim 6, wherein said step of inserting a pilot signal includes the step of generating said pilot signal so as to be disposed on one of an in-phase axis and a quadrature-phase axis in a signal space of said $2^m$-signal point quadrature amplitude modulation.

8. A method as defined in claim 1, wherein said 8-or-more-signal-point modulation scheme is an 8 phase shift keying.

9. A method as defined in claim 8, wherein said step of inserting a pilot signal includes the step of generating said pilot signal so as to make an angle of $\pi/8$ with adjacent information signals in an in-phase and quadrature-phase signal space of said 8 phase shift keying.

10. A method of transmitting digital data by wireless so as to enable a reception at a reduced bit error rate, the method including the steps of:

converting said digital data into a first stream of information signals through a quadrature phase shift keying modulation;

inserting a pilot signal regularly in said first stream of said information signals to generate a second stream, an amplitude of said pilot signal being larger than that of any of said information signals; and transmitting said second stream by wireless.

11. A method as defined in claim 10, wherein said pilot signal is so disposed as to make an angle of $\pi/4$ with adjacent information signals in an in-phase and quadrature-phase signal space of said quadrature phase shift keying modulation.

12. A method as defined in claim 10, wherein said step of inserting a pilot signal includes the step of setting said amplitude of said pilot signal not larger than 1.6 times a maximum possible amplitude of said information signals.

13. A method as defined in claim 10, further including the step of limiting a frequency band of each information signal with a roll-off filter with a roll-off coefficient ranging from 0.1 to 0.4.

14. A system capable of transmitting digital data by wireless so as to enable a reception at a reduced bit error rate, the system including:

means for converting said digital data into a first stream of information signals through an 8-or-more-signal-point modulation scheme;

means for inserting a pilot signal regularly in said first stream of said information signals to generate a second stream, an amplitude of said pilot signal being larger than that of any of said information signals; and means for transmitting said second stream by wireless.

15. A system as defined in claim 14, wherein said inserting means includes means setting said amplitude of said pilot signal not larger than 1.6 times a maximum possible amplitude of said information signals.

16. A system as defined in claim 14, further including means for limiting a frequency band of each information signal with a roll-off filter with a roll-off coefficient ranging from 0.1 to 0.4.

17. A system as defined in claim 14, wherein said 8-or-more-signal-point modulation scheme is a 16-amplitude phase shift keying.

18. A system as defined in claim 17, wherein said pilot signal is so disposed as to make an angle of $\pi/8$ with adjacent information signals in an in-phase and quadrature-phase signal space.

19. A system as defined in claim 14, wherein said 8-or-more-signal-point modulation scheme is a $2^m$-signal-point quadrature amplitude modulation, where m is a positive integer not smaller than 3.

20. A system as defined in claim 19, wherein said pilot signal is disposed on one of an in-phase axis and a quadrature-phase axis in a signal space of said $2^m$-signal point quadrature amplitude modulation.

21. A system as defined in claim 14, wherein said 8-or-more-signal-point modulation scheme is an 8 phase shift keeping.

22. A system as defined in claim 21, wherein said pilot signal is so disposed as to make an angle of $\pi/8$ with adjacent information signals in an in-phase and quadrature-phase signal space of said 8 phase shift keying.

23. A system capable of transmitting digital data by wireless so as to enable a reception at a reduced bit error rate, the system including:
 means for converting said digital data into a first stream of information signals through a quadrature phase shift keying modulation;
 means for inserting a pilot signal regularly in said first stream of said information signals to generate a second stream, an amplitude of said pilot signal being larger than that of any of said information signals; and
 means for transmitting said second stream by wireless.

24. A system as defined in claim 23, wherein said pilot signal is so disposed as to make an angle of $\pi/4$ with adjacent information signals in an in-phase and quadrature-phase signal space of said quadrature phase shift keying modulation.

25. A system as defined in claim 23, wherein said inserting means includes means setting said amplitude of said pilot signal not larger than 1.6 times a maximum possible amplitude of said information signals.

26. A system as defined in claim 23, further including means for limiting a frequency band of each information signal with a roll-off filter with a roll-off coefficient ranging from 0.1 to 0.4.

27. A mobile telephone that communicates digital data at a reduced bit error rate, the mobile telephone comprising:
 a transmission system; and
 a receiver system, said transmission system including:
  means for converting said digital data into a first stream of information signals through an 8-or-more-signal-point modulation scheme;
  means for inserting a pilot signal regularly in said first stream of said information signals to generate a second stream, an amplitude of said pilot signal being larger than that of any of said information signals; and
  means for transmitting said second stream.

28. A mobile telephone as defined in claim 27, wherein said inserting means includes means setting said amplitude of said pilot signal not larger than 1.6 times a maximum possible amplitude of said information signals.

29. A mobile telephone as defined in claim 27, further including means for limiting a frequency band of each information signal with a roll-off filter with a roll-off coefficient ranging from 0.1 to 0.4.

30. A device including transmitting means for transmitting digital data by wireless so as to enable a reception at a reduced bit error rate, the system including:
 means for converting said digital data into a first stream of information signals through a 4-signal-point modulation scheme;
 means for inserting a pilot signal regularly in said first stream of said information signals to generate a second stream, an amplitude of said pilot signal being larger than that of any of said information signals; and
 means for transmitting said second stream by wireless.

31. A device including receiving means for obtaining a lower-bit-error-rate bit stream from a radio wave wherein the radio wave is a modulated version of a stream of information signals and pilot signals regularly inserted in the information signals, the amplitude of each pilot signal being larger than that of any of said information signals, the receiving means comprising:
 means for obtaining a base band signal stream from said radio wave;
 means for providing a fading-distortion-compensated version of each signal of said base band signal stream through interpolation using a relevant one of said pilot signals included in said base band signal stream; and
 means for obtaining said lower-bit-error-rate bit stream from said fading-distortion-compensated base band signal stream.

32. A device as defined in claim 31, wherein said amplitude of each pilot signal is not larger than 1.6 times a maximum possible amplitude of said information signals.

33. A device as defined in claim 31, further including means for limiting a frequency band of each signal of said base band signal stream with a roll-off filter with a roll-off coefficient ranging from 0.1 to 0.4.

34. A mobile telephone that communicates digital data at a reduced bit error rate, the mobile telephone comprising:
 a transmission system; and
 a receiver system, said transmission system including:
  means for converting said digital data into a first stream of information signals through a 4-signal-point modulation scheme;
  means for inserting a pilot signal regularly in said first stream of said information signals to generate a second stream, an amplitude of said pilot signal being larger than that of any of said information signals; and
  means for transmitting said second stream.

* * * * *